(12) United States Patent
Yu

(10) Patent No.: US 12,547,629 B2
(45) Date of Patent: Feb. 10, 2026

(54) METHOD OF PROCESSING ENCRYPTION OF DATABASE STORAGE DATA AND DATABASE MANAGEMENT SYSTEM

(71) Applicant: OWL Systems, Inc., Seoul (KR)

(72) Inventor: Jun Ho Yu, Gwacheon-si (KR)

(73) Assignee: OWL Systems, Inc., Seoul (KR)

( * ) Notice: Subject to any disclaimer, the term of this patent is extended or adjusted under 35 U.S.C. 154(b) by 0 days.

(21) Appl. No.: 18/953,674

(22) Filed: Nov. 20, 2024

(65) Prior Publication Data
US 2025/0173340 A1 May 29, 2025

(30) Foreign Application Priority Data
Nov. 27, 2023 (KR) .......................... 10-2023-0166784

(51) Int. Cl.
*G06F 16/2455* (2019.01)
*G06F 21/62* (2013.01)

(52) U.S. Cl.
CPC .... *G06F 16/24553* (2019.01); *G06F 21/6218* (2013.01)

(58) Field of Classification Search
CPC ............... G06F 21/6218; G06F 21/602; G06F 21/6227; G06F 16/24553
See application file for complete search history.

(56) References Cited

U.S. PATENT DOCUMENTS

| 2019/0286837 A1* | 9/2019 | Yim ....................... G06F 21/602 |
| 2021/0326311 A1* | 10/2021 | Ker ....................... G06F 21/602 |

FOREIGN PATENT DOCUMENTS

| KR | 10-1476039 B1 | 12/2014 |
| KR | 10-2023-0123715 A | 8/2023 |

* cited by examiner

*Primary Examiner* — Jay A Morrison
(74) *Attorney, Agent, or Firm* — Sughrue Mion, PLLC

(57) ABSTRACT

Provided are a method of processing encryption of database (DB) storage data and a database management system (DBMS). The method includes, when an encrypted column inquiry request is received through an application, executing a hooking module, inquiring about, by the executed hooking module, encryption data in a DB of a DBMS, and decrypting retrieved encryption data and transmitting the decrypted data to the application. According to the method, a DB client intervenes in structured query language (SQL) transmission to a DB server and a data receiving process to automatically perform encryption and decryption. Accordingly, it is possible to automatically decrypt encrypted data without modifying an application source, or conversely, input data to a DB in an encrypted state.

4 Claims, 5 Drawing Sheets

METHOD OF PROCESSING ENCRYPTION OF DATABASE STORAGE DATA AND DATABASE MANAGEMENT SYSTEM

CROSS-REFERENCE TO RELATED APPLICATION

This application claims priority to and the benefit of Korean Patent Application No. 10-2023-0166784, filed on Nov. 27, 2023, the disclosure of which is incorporated herein by reference in its entirety.

BACKGROUND

1. Field of the Invention

The present invention relates to a technology for encrypting database (DB) storage data.

2. Discussion of Related Art

There are two main methods of applying database (DB) encryption: an application program interface (API) method and a plug-in method. The API is an encryption/decryption function provided in accordance with each development language, such as C, JAVA, or the like, and is mainly used by developers.

A plug-in is provided in the form of a structured query language (SQL) function and is easily used by developers and general DB users.

In most cases, the two methods are used together, which is referred to as a hybrid method.

The two types of methods, API and plug-in methods, both require a user to manually write and process an encryption/decryption function in the process of inputting and outputting data. This is the greatest inconvenience that users have experienced since the introduction of DB encryption products.

In particular, developers have to find all code related to an encryption DB column in existing source code which operates stably and apply a decryption function, which may be a big burden.

For this reason, a view/trigger method in which source code is not modified and data is accessed in the same way as before without any additional task in a query tool is preferred. This is a method in which encrypted data is automatically decrypted through a view created in a DB when data is retrieved, and conversely, when data is input, the data is automatically encrypted by a trigger.

However, the view/trigger method works on the basis of plug-ins. Since the plug-in method employs a central processing unit (CPU) and a memory of a server where a database management system (DBMS) is running, all load on the entire network system related to encryption and decryption is concentrated on a DB server.

In addition, data that has already been decrypted using the plug-in method is transmitted in a decrypted state from a DBMS across a network. Accordingly, there are security vulnerabilities, such as decrypted data being directly exposed in the case of peeking at network packets using a method of packet sniffing or the like.

Since data is automatically decrypted and shown by a view in all environments where a DBMS is accessible, security problems occur. This has led to DB encryption products providing a minimal access control function. However, there are inherent limitations to performing full access control in this way, and this function also generates additional inputs and outputs on the DBMS, which may be a burden on the performance.

In addition, to use the view/trigger method without problems, tuning of existing SQL code is necessary.

RELATED ART DOCUMENT

Patent Document

Korean Patent Registration No. 10-2023-0123715A
Korean Patent No. 10-1476039 B1

SUMMARY OF THE INVENTION

The present invention is directed to providing a database (DB) encryption/decryption application method in which an encryption/decryption function uses an application programming interface (API) to have almost the same effect as applying the view/trigger method without imposing any load on a database management system (DBMS).

In order to achieve the above objectives, the present invention includes following configurations.

According to an aspect of the present invention, there is provided a method of processing encryption of DB storage data which is performed by a computing device including one or more processors and a memory configured to store one or more programs executed by the one or more processors, the method including, when an encrypted column inquiry request is received through an application, executing a hooking module, inquiring about, by the executed hooking module, encryption data in a DB of a DBMS, and decrypting retrieved encryption data and transmitting the decrypted data to the application.

According to another aspect of the present invention, there is provided a DBMS including a computer device including one or more processors, a memory configured to store one or more programs executed by the one or more processors, the DBMS including a DB server configured to perform DB management, and an application server including a hooking module configured to inquire about, when an encrypted column inquiry request is received from a DB of the DB server through an application, encryption data through a DB client module, decrypt retrieved encryption data, and transmit the decrypted data to the application.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

It should be noted that technical terms used in the present invention are merely used for describing a specific embodiment and are not intended to limit the invention. Also, unless particularly defined otherwise, technical terms used herein should be interpreted with meanings that are generally understood by those of ordinary skill in the art to which the present invention pertains, and should not be construed with excessively comprehensive meanings or excessively reduced meanings.

Hereinafter, exemplary embodiments of the present invention will be described in detail with reference to the accompanying drawings.

A database management system (DBMS) according to exemplary embodiments of the present invention may be implemented by at least one computing device, and a method of processing encryption of DB storage data according to exemplary embodiments of the present invention may be performed by at least one computing device included in the DBMS. On the computing device, a computer program according to an exemplary embodiment of the present invention may be installed and run, and the computing device may perform the method of processing encryption of DB storage data according to exemplary embodiments of the present invention under the control of the running computer program. The foregoing computer program may be stored in a computer-readable recording medium to be combined with the computing device and cause the computing device to perform the method of processing encryption of DB storage data.

Figure 1:
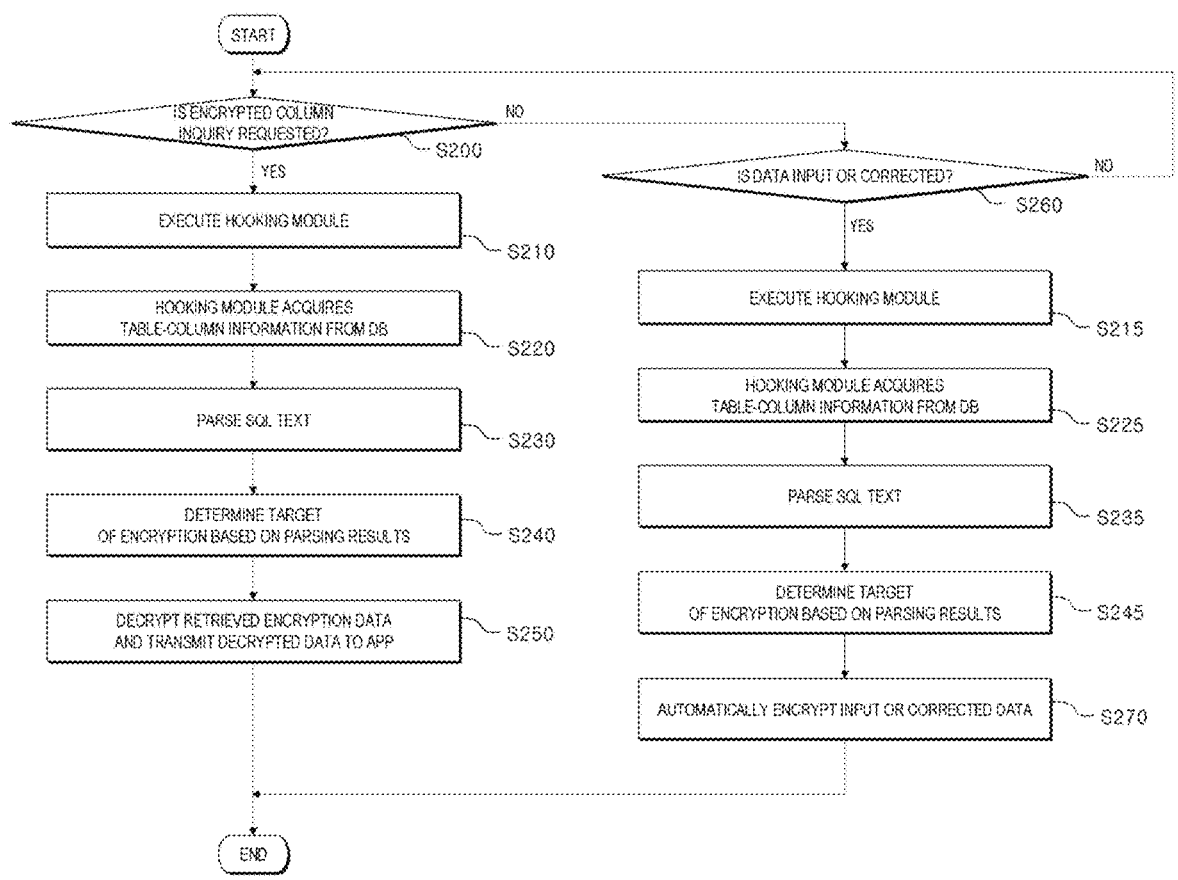
FIG. 1 is a flowchart illustrating a method of processing encryption of database (DB) storage data according to an exemplary embodiment of the present invention.

FIG. 1 is a flowchart illustrating a method of processing encryption of DB storage data according to an exemplary embodiment of the present invention.

A method of processing encryption of DB storage data according to an exemplary embodiment employs an application programming interface (API) to have almost the same effect as applying the view/trigger method.

In other words, users do not correct any source, and users who write structured query language (SQL) text using a query tool also use the same SQL as before without any additional work. However, as a result, input data is automatically encrypted and stored, and output data is automatically decrypted.

In particular, this is performed not by a DBMS but on an application side. Accordingly, no load is imposed on a DBMS, and even when data is transmitted via a network, the data is kept in an encrypted state, making it safer in terms of security.

To process this, hooking is performed on an existing DB client module that transmits SQL text written by an application to a DBMS.

In the method of processing encryption of DB storage data according to an exemplary embodiment, when an encrypted column inquiry request is received through an application (S200), a hooking module is executed (S210).

Then, the executed hooking module inquires about encryption data in a DB of a DBMS.

In an aspect, to inquire about encryption data, table-column information to which encryption has been applied is acquired from the DB (S220), and SQL text written by a user through the application is parsed (S230).

Then, the SQL text written by the user is parsed. SQL parsing may be performed by an SQL parser embedded in the DBMS. The SQL parser may perform parsing in accordance with a process of analyzing SQL text and generating a syntax tree or an execution plan. The SQL parser interprets the SQL text using certain rules and converts the SQL text into a format that is understandable by a DB engine.

According to an exemplary embodiment, the SQL parser divides the SQL text into small units, which are meaningful parts referred to as "tokens," converts the tokenized SQL text into a tree structure in accordance with syntax rules, and analyzes the syntax tree to determine the meanings of objects such as tables, columns, functions, and the like. Then, the SQL parser checks consistency with a DB schema and validates the query.

Subsequently, it is determined whether there is a target of encryption in tables and columns that are accessed as parsing results (S240).

Here, determining whether there is a target of encryption may be performed on the basis of preset security requirements.

For example, sensitive information may be identified through data classification and monitoring. In other words, a table and column with sensitive data are identified, and access to and changes of such data are monitored to detect a security event.

Also, security policies may be defined in advance to determine the right to access a specific table or column or whether encryption is necessary in accordance with policy-based security.

Before a specific query or data manipulation task is executed, a user-defined function (UDF) for determining whether to perform encryption is used to examine data, and it is determined whether encryption is necessary. Alternatively, the SQL text may be statically analyzed to understand characteristics of the query, and whether tables and columns used in the query contain sensitive data may be determined to determine whether encryption is necessary.

In addition, during the execution time, SQL queries may be dynamically analyzed to identify a query for accessing specific data, and additional protection measures may be taken for the corresponding data through encryption.

Subsequently, retrieved encryption data is decrypted and transmitted to the application (S250).

In the transmission operation, when it is determined in the inquiry operation that an SQL sentence is a column to be inquired by a SELECT sentence in accordance with the type of SQL sentence, user data is decrypted, and a result value of the SQL text is transmitted to the application.

On the other hand, when it is determined in the inquiry operation that an SQL sentence is input data or comparative data of a sentence other than a SELECT sentence in accordance with the type of SQL sentence, the SQL text is modified with the user data encrypted and then transmitted to the DBMS.

In an additional aspect of the present invention, when data is input to the DB of the DBMS or corrected (S260), the hooking module is executed (S215).

Then, the executed hooking module inquires about encryption data in the DB of the DBMS.

In an aspect, table-column information to which encryption has been applied is acquired from the DB to inquire about encryption data (S225), and SQL text written by the user through an application is parsed (S235).

Then, it is determined whether there is a target of encryption in tables and columns that are accessed as parsing results (S245).

Here, determining whether there is a target of encryption may be performed on the basis of the preset security requirements.

Then, the input or corrected data is automatically encrypted (S270).

In the encryption operation, an encryption key and an encryption algorithm are selected in accordance with the predefined policies, whether to perform partial encryption is determined, and then encryption is performed.

In other words, in the method of processing encryption of DB storage data according to an exemplary embodiment, an encryption key to be applied to encryption and decryption processes of data stored in the DB may be selected in accordance with the predefined policies.

Here, a different reference may be applied to selection of an encryption key depending on security, efficiency, and a specific case.

In other words, an encryption key may be selected on the basis of the importance of stored data and security policies. For example, one of a data encryption key (DEK) that plays an important role in protecting sensitive data in the DB and a master key for managing and protecting multiple symmetric keys used in the DB may be selected, or one of a public key, a private key, a hash key, a key used in a key management service, and a key used in tokenization may be selected. However, an encryption key is not limited thereto.

In addition, an encryption algorithm may be selected in accordance with the predefined policies.

For example, in the case of the advanced encryption standard (AES), the Rivest-Shamir-Adleman (RSA) algorithm which is mainly used for key exchanges and digital signatures, elliptic curve cryptography (ECC) which is advantageous for use in a mobile device or an environment with limited resources, a distributed DB, and a blockchain-based application, a blockchain-based encryption algorithm may be selected. In other words, an optimal algorithm may be selected from among various algorithms on the basis of the predefined policies and a monitored data storage state. However, an encryption algorithm is not limited thereto.

Further, a setting of whether to perform partial encryption may be applied differently. For example, only encrypted data may be stored in a specific field or a column such that a field including sensitive information, such as a credit card number or a social security number, is selectively encrypted.

Otherwise, depending on the importance of data, important data may be completely encrypted, and data with relatively low importance may not be encrypted or may be partially encrypted. Additionally, an option may be provided to select whether to apply encryption at a user or application level such that only sensitive information selected as necessary is encrypted.

The method of processing encryption of DB storage data according to an exemplary embodiment is performed as if a DB client automatically performed encryption and decryption by intervening in SQL transmission to a DB server and a data receiving process. Accordingly, a user can automatically decrypt encrypted data without modifying a source, or conversely, can input data to a DB in an encrypted state.

Such a process is performed at a DB client end, and thus data is transmitted across a network in an encrypted state, which is advantageous for security. Also, no load is imposed on a DBMS by data encryption and decryption.

In other words, the method of processing encryption of DB storage data according to an exemplary embodiment does not require correction of an application source. Also, it is possible to automatically convert encrypted data into plaintext and view the plaintext or automatically encrypt data input by a user without using a plug-in function in a query tool such as SQL*Plus, Toad, Orange, and the like.

Since no view/trigger is used, no additional work is necessary for a DB, and the security of data can be maintained without any DB load caused by encryption and decryption.

In addition, since data is encrypted and transmitted in communication between the DB server and the application, safety is ensured in a network section.

In an additional aspect, in the method of processing encryption of DB storage data according to an exemplary embodiment, it may be verified whether a column which requires encryption in data received by the application from the DB server has actually been encrypted.

Figure 2:
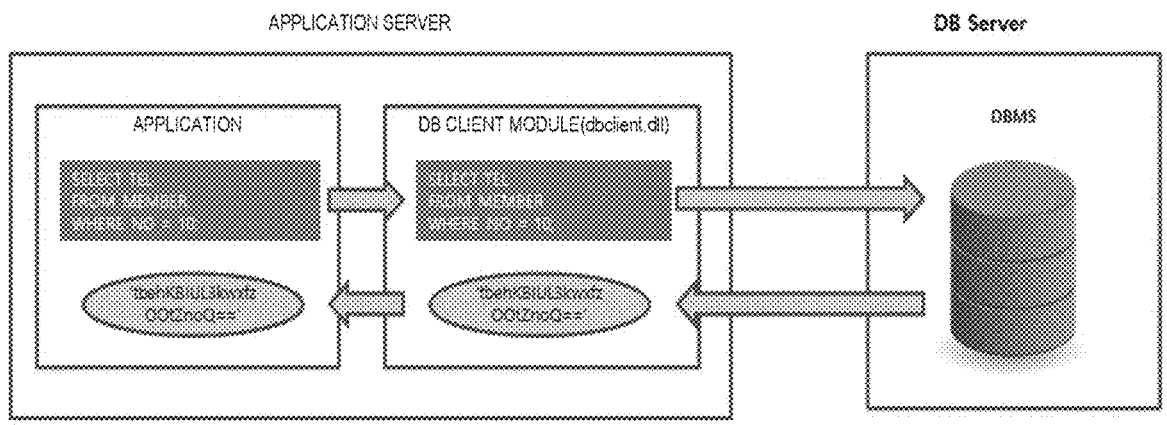
FIGS. 2 and 3 are diagrams illustrating a process of inquiring about an encrypted column TEL in a method of processing encryption of DB storage data according to an exemplary embodiment.
Figure 3:
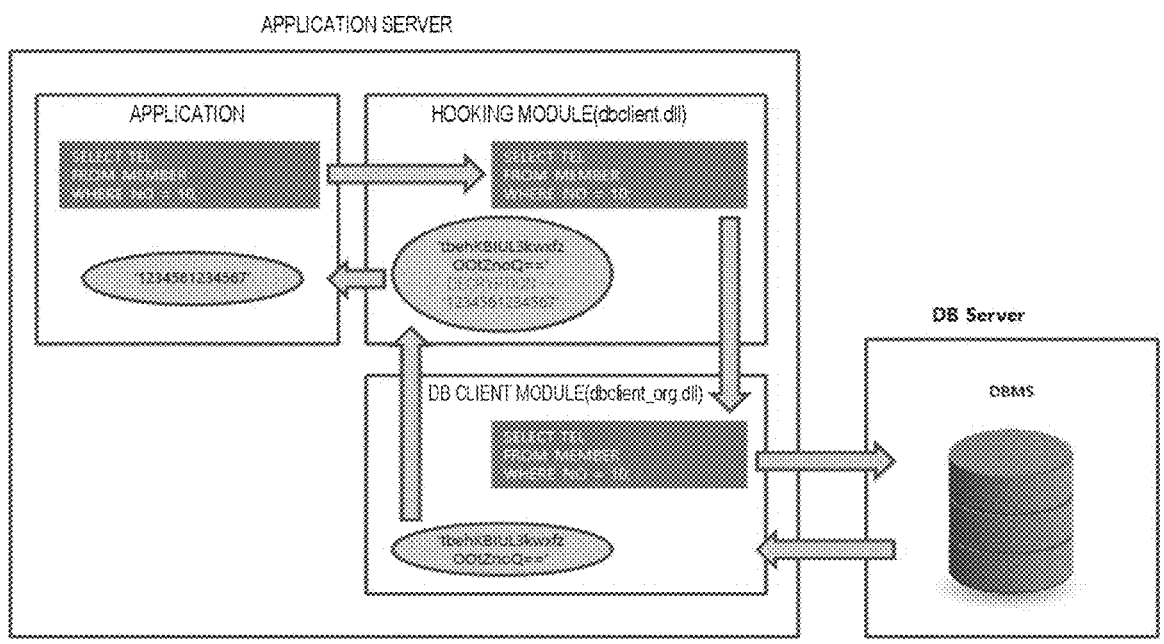

FIGS. 2 and 3 are diagrams illustrating a process of inquiring about an encrypted column TEL in a method of processing encryption of DB storage data according to an exemplary embodiment.

In the case of inquiring about an encrypted column TEL, an application generally obtains data in accordance with a process illustrated in FIG. 2. FIG. 2 shows a SELECT handling process in a general situation.

In FIG. 2, "dbclient.dll" which is a DB client module used for the application to execute SQL text is renamed "client_org.dll," and then a "dll" file created for hooking is renamed "client.dll" which is the original name.

Accordingly, when the application executes the SQL text, "client.dll" which is a hooking module is loaded instead of the original module, and the module internally calls "client_org.dll" which is the original module such that basic functions of the DB client may be performed without any change.

Referring to a SELECT sentence handling process through a hooking module, that is, an automatic decryption process, in FIG. 3, encryption data retrieved from the DB by the hooking module is automatically decrypted and transmitted to an application.

Specifically, the DB client module (client_org.dll) brings table-column information to which encryption has been applied from the DB.

Then, SQL text written by a user is parsed, and it is determined whether there is a target of encryption in tables and columns that are accessed as parsing results.

When access to the target of encryption is detected, a corresponding task is performed in accordance with a type of SQL sentence.

For example, when an SQL sentence is a column to be inquired by the SELECT sentence, user data may be decrypted and returned to the application as a result value of the SQL text.

When an SQL sentence is input data of other sentences (INSERT, UPDATE, and DELETE) or comparative data of a WHERE clause, the SQL text is modified with the user data encrypted and then transmitted to a DBMS.

Figure 4:
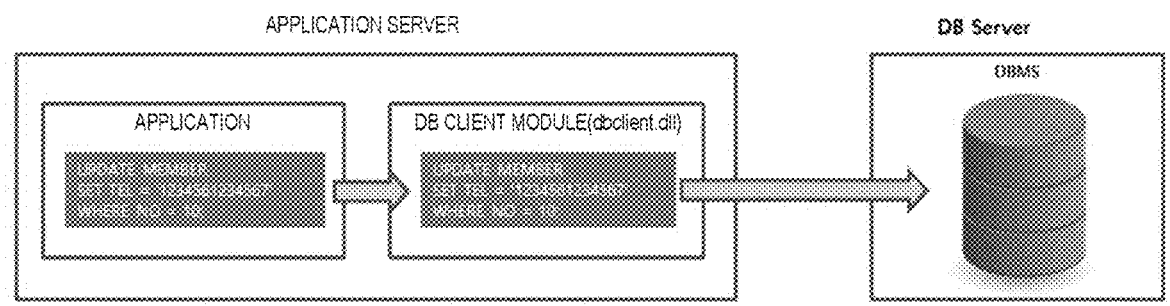
FIGS. 4 and 5 are diagrams illustrating a process of inputting or correcting data in a method of processing encryption of DB storage data according to an exemplary embodiment.
Figure 5:
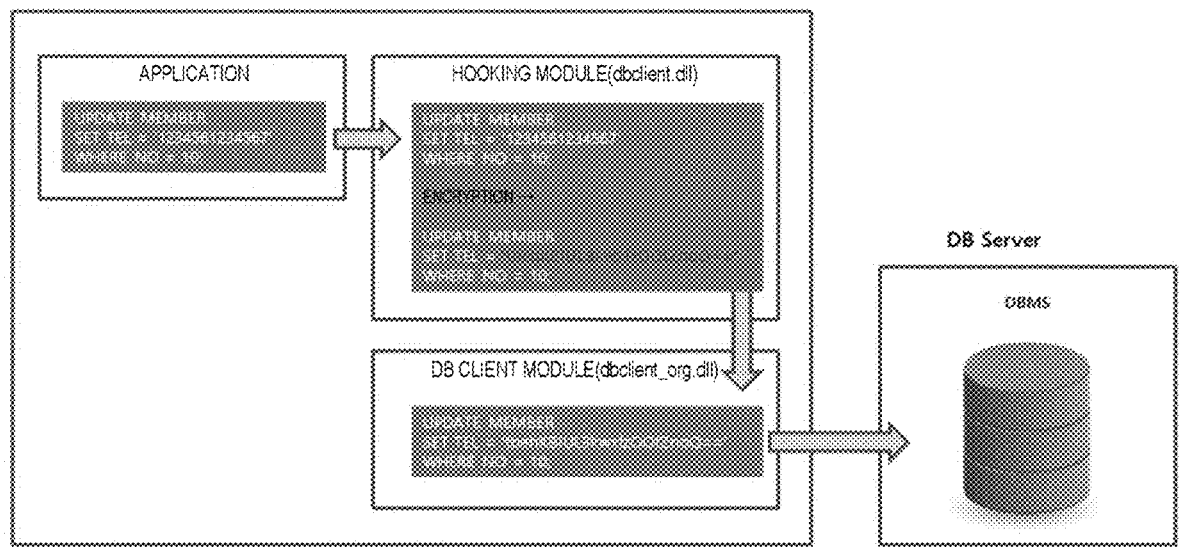

FIGS. 4 and 5 are diagrams illustrating a process of inputting or correcting data in a method of processing encryption of DB storage data according to an exemplary embodiment.

In other words, when new data is input (INSERT) to a DBMS or data stored in a DBMS is corrected (UPDATE), the data may be automatically encrypted and then transmitted to a DB server for storage.

In general, security and a user's convenience are at odds with each other, and one is frequently sacrificed for the other. However, with the method of processing encryption of DB storage data according to an exemplary embodiment, it is possible to maintain security and provide maximum convenience to a user at the same time. In addition, the performance of a DB server can be improved.

Figure 6:
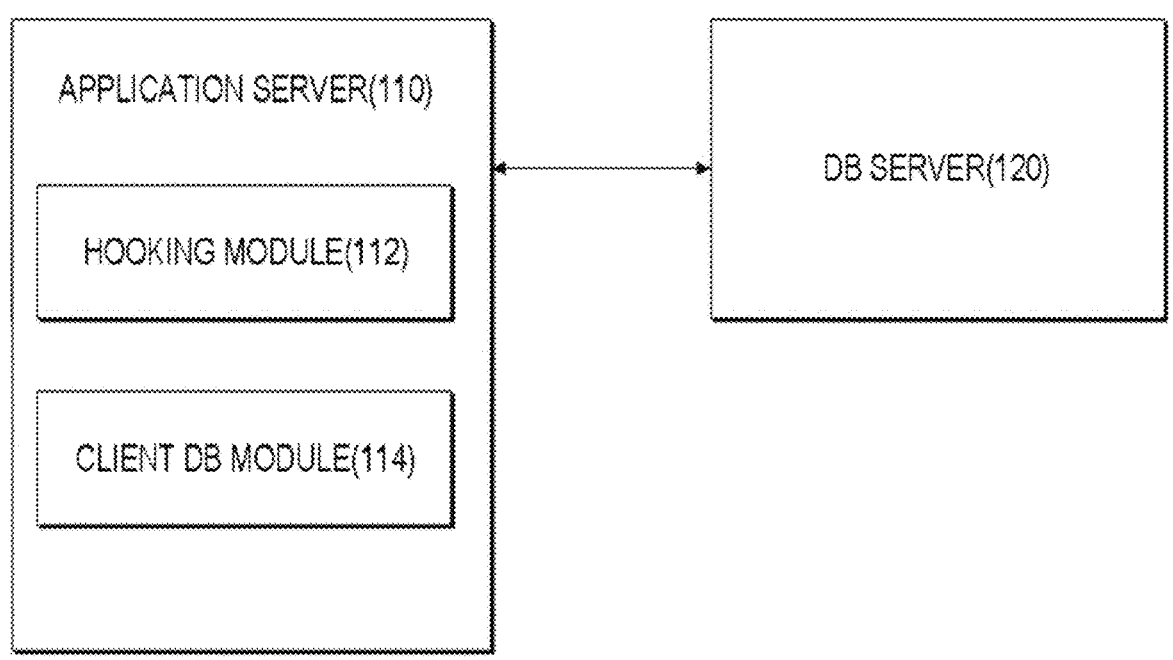
FIG. 6 is a block diagram of a database management system (DBMS) according to an exemplary embodiment.

FIG. 6 is a block diagram of a DBMS according to an exemplary embodiment.

A DBMS according to an exemplary embodiment includes a DB server 120 and an application server 110.

The DB server 120 manages a DB. The DB server 120 executes the DBMS to process various tasks for the DB. The DB server 120 may run a DB system by performing DB generation, management, update, query processing, and the like.

According to an exemplary embodiment, the DB server 120 executes a specific DBMS and performs all management tasks for the DB through the DBMS. The DBMS may be one of MySQL, PostgreSQL, the Microsoft SQL server, and the Oracle Database. However, the DBMS is not limited thereto.

Also, the DB server 120 generates a new DB by generating or correcting DB objects, such as tables, indices, views, stored procedures, and the like, manages the structure of the existing DB, processes a data request from another system or an application or a client application program running on the application server 110, and executes the query to return the result.

Data search, insertion, update, removal, and the like are possible, and it is possible to manage the right to access the DB, protect sensitive information by applying security policies, and maintain the integrity and security of the DB through user authentication and authorization.

The application server 110 includes a hooking module 112 that, when an encrypted column inquiry request is received from the DB of the DB server 120 through the application, inquires about encryption data through a DB client module, decrypts retrieved encryption data, and transmits the decrypted data to the application.

The application server 110 is a server that executes and manages software application programs. The application server 110 receives and processes a user's request and returns the result to a client application or the user, and the result may be used in web applications and enterprise applications.

The application server 110 may simultaneously execute and manage several application programs, manages communication with a client, and supports various protocols. For example, hypertext transfer protocol (HTTP), HTTP over secure sockets layer (SSL) (HTTPS), transmission control protocol (TCP)/Internet protocol (IP), and the like may be used for interacting with the client. To process multiple simultaneous requests, the application server 110 efficiently manages threads using a thread pool and provides security functions such as user authentication, authorization, data protection, and the like. The application server 110 is used in various languages, such as JAVA Enterprise Edition (EE), .NET, hypertext preprocessor (PHP), Python, and the like, and frameworks, and the configuration and settings of the application server 110 are diversely changeable.

The hooking module 112 is a software module that intercepts or changes a specific event, function, or task in a computer program or system. The hooking module 112 is used to monitor or correct operations of a program and may be utilized for various purposes such as debugging, security, tracking a specific operation, correcting a user interface, and the like.

According to an exemplary embodiment, the hooking module 112 performs hooking on the existing DB client module that transmits SQL text written by the application in the application server 110 to the DBMS of the DB server 120. The hooking module 112 may perform functions including API hooking of intercepting or changing a specific API function when a program calls the API function, function hooking of intercepting or changing a call of a specific function to have a desired operation performed, message hooking of intercepting or changing a message transmitted between systems or application programs, event hooking of intercepting or processing a specific event when the event occurs, file system hooking of intercepting or changing a file system operation to monitor or control the manipulation of a specific file, and the like. However, functions of the hooking module 112 are not limited thereto.

The client DB module 144 supports interaction between the application and the DB and performs tasks related to interoperation with the DB server 120 and query execution. The client DB module 114 handles communication between the client application and the DB and may process create, read, update, and delete (CRUD) tasks of data.

The client DB module 114 may set and manage a connection with the DB server 120. The client DB module 114 may provide efficient connection management using connection pooling and allows the application to safely access the DB of the DB server 120.

The client DB module 114 may execute the query on the DB using SQL or another query language and perform inquiry, update, insertion, removal, and the like of data in accordance with a request of the user or application.

Figure 7:
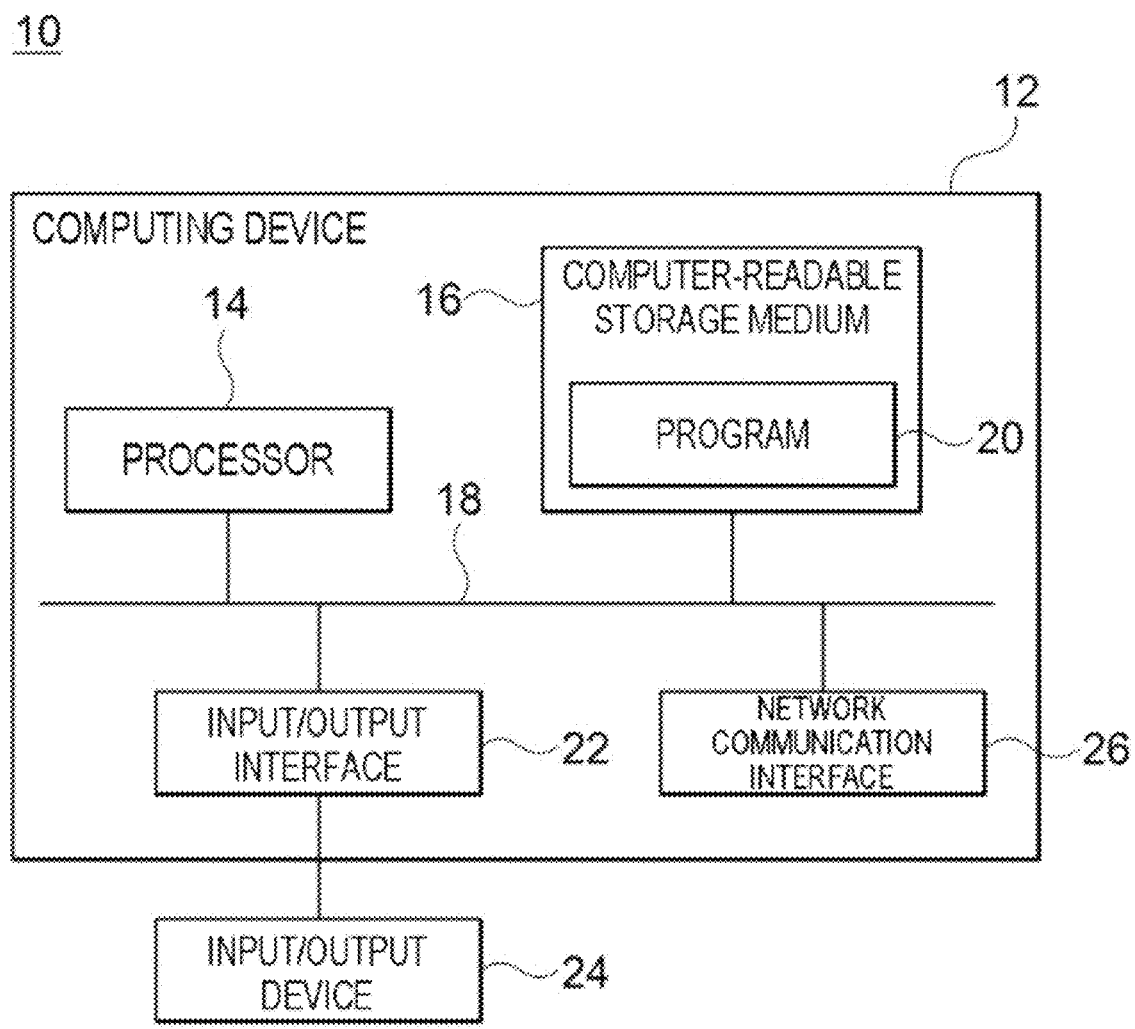
FIG. 7 is a block diagram illustrating a computing environment including a computing device suitable for use in exemplary embodiments.

In addition, the client DB module 114 may receive a query execution result from the DB server 120, process the query execution result in the form of a required format, and return the processed query execution result to the application. The client DB module 114 may also process an error in the result, convert the data, and perform filtering FIG. 7 is a block diagram illustrating a computing environment 10 including a computing device suitable for use in exemplary embodiments.

In the exemplary embodiment shown in the drawing, the components may have functions and capabilities other than those described below, and additional components other than those described below may be included.

The computing environment 10 shown in the drawing includes a computing device 12. According to an exemplary embodiment, the computing device 12 may be an active learning algorithm training device based on a long-term observation.

The computing device 12 includes at least one processor 14, a computer-readable storage medium 16, and a communication bus 18. The processor 14 may allow the computing device 12 to operate in accordance with one of the foregoing exemplary embodiments. For example, the processor 14 may execute one or more programs stored in the computer-readable storage medium 16. The one or more programs may include one or more computer-executable instructions, and when the computer-executable instructions are executed by the processor 14, the computer-executable instructions may cause the computing device 12 to perform operations in accordance with an exemplary embodiment.

The computer-readable storage medium 16 is configured to store computer-executable instructions or program code, program data, and/or information in another appropriate form. A program 20 stored in the computer-readable storage medium 16 includes a set of instructions executable by the processor 14. According to an exemplary embodiment, the computer-readable storage medium 16 may be a memory (a volatile memory, such as a random access memory (RAM), a non-volatile memory, or an appropriate combination thereof), one or more magnetic disk storage devices, optical disc storage devices, flash memory devices, storage media in other forms that may be accessed by the computing device 12 and store desired information, or an appropriate combination thereof.

The communication bus 18 interconnects various different components of the computing device 12 including the processor 14 and the computer-readable storage medium 16.

The computing device 12 may include at least one input/output (I/O) interface 22 that provides an interface for at least one I/O device 24 and at least one network communication interface 26. The I/O interface 22 and the network communication interface 26 are connected to the communication bus 18. The I/O device 24 may be connected to other components of the computing device 12 via the I/O interface 22. The exemplary I/O device 24 may include input devices, such as a pointing device (a mouse, a trackpad, or the like), a keyboard, a touch input device (a touchpad, a touchscreen, or the like), a voice or sound input device, and various kinds of sensor devices and/or imaging devices, and/or output devices such as a display device, a printer, a speaker, and/or a network card. The exemplary I/O device 24 may be included in the computing device 12 as one component constituting the computing device 12, or connected to the computing device 12 as a device separate from the computing device 12.

The above-described method may be implemented as an application or implemented in the form of program instructions that can be executed by various computer components, and recorded on a computer-readable recording medium. The computer-readable recording medium may include program instructions, data files, data structures, and the like solely or in combination.

The program instructions recorded on the computer-readable recording medium are specially designed for the present invention and may be well known and available to those skilled in the computer software field.

Examples of the computer-readable recording medium include magnetic media such as a hard disk, a floppy disk, and magnetic tape, optical media such as a CD-ROM and a DVD, magneto-optical media such as a floptical disk, and hardware devices, such as a ROM, a RAM, a flash memory, and the like, that are specially configured to store and execute program instructions.

Examples of the program instructions include not only machine language code generated by a compiler but also high-level language code that is executable by a computer using an interpreter or the like. The hardware devices may be configured to operate as one or more software modules to perform a process in accordance with the present invention, and vice versa.

According to the present invention, a DB client automatically performs encryption and decryption by intervening in SQL transmission to a DB server and a data receiving process. Accordingly, encrypted data can be automatically decrypted or input to a DB in an encrypted state without any modification to an application source.

Further, encryption and decryption are performed at a DB client end, and thus the corresponding data is transmitted in an encrypted state across a network. Accordingly, it is advantageous for security, and no load is imposed on a DBMS by data encryption and decryption.

Moreover, with a method of processing encryption of DB storage data according to an exemplary embodiment, it is possible to not only retain the security but also provide maximum convenience to a user. In addition, it is possible to improve performance of a DB server.

Although the present invention has been described above with reference to exemplary embodiments, those of ordinary skill in the art should appreciate that the present invention can be diversely modified and altered without departing from the spirit and scope of the present invention described in the following claims.

What is claimed is:

1. A method of processing encryption of database (DB) storage data which is performed by a computing device including one or more processors and a memory configured to store one or more programs executed by the one or more processors, the method comprising:
when an encrypted column inquiry request is received through an application by an application server to which an application programming interface (API) is applied, executing a hooking module;
inquiring about, by the executed hooking module, encryption data in a DB of a database management system (DBMS); and
decrypting retrieved encryption data and transmitting the decrypted data to the application,
wherein the inquiring about encryption data comprises:
acquiring table-column information to which encryption has been applied from the DB;
parsing structured query language (SQL) text written by the application by tokenizing the SQL text, generating a syntax tree according to syntax rules, and analyzing the syntax tree to identify objects including tables and columns designated for encryption; and
determining whether there is a target of encryption in tables and columns that are accessed as parsing results,
wherein the transmitting of the decrypted data comprises:
when it is determined in the inquiring about encryption data that an SQL sentence is a column to be inquired by a SELECT sentence in accordance with a type of SQL sentence, decrypting user data and transmitting a result value of the SQL text to the application; and
when it is determined in the inquiring about encryption data that the SQL sentence is input data or comparative data of a sentence other than a SELECT sentence in accordance with the type of SQL sentence, modifying the SQL text with the user data encrypted and transmitting the modified SQL text to the DBMS,
and further comprising verifying whether a column which requires encryption in data received by the application from the DB server has actually been encrypted,
wherein data transmitted and received between the application server and the DBMS is kept in an encrypted state,
the data in the encrypted state is encrypted or decrypted by the application in the application server to reduce load on the DBMS,
the application server renames "dbclient.dll," which is a DB client module used for executing SQL text, "client_org.dll," which is preset, and then renames a "dll" file created for hooking "client.dll" which is an original name, and
when the application executes the SQL text, the application loads "client.dll," which is the hooking module, and then internally calls "client_org.dll," which is the original module, to perform an encryption process or a decryption process; and internally calling "client_org.dll" such that basic DB client functions are performed without change; wherein the application source code is unmodified and no DB view, trigger, or plug-in is required.

2. The method of claim 1, further comprising, when data is input to the DB of the DBMS or corrected, automatically encrypting, by the hooking module executed in the application server to which the API is applied, the input or corrected data.

3. The method of claim 2, wherein the encrypting of the input or corrected data comprises selecting an encryption key and an encryption algorithm in accordance with a predefined policy, determining whether to perform partial encryption, and then performing encryption.

4. A database management system (DBMS) comprising a computing device including one or more processors and a memory configured to store one or more programs executed by the one or more processors, the DBMS comprising:

a DB server configured to perform DB management; and an application server including a hooking module configured to inquire about, when an encrypted column inquiry request is received from a DB of the DB server through an application, encryption data through a DB client module, decrypt retrieved encryption data, and transmit the decrypted data to the application, wherein the application server acquires table-column information to which encryption has been applied from the DB, parses structured query language (SQL) text written by the application by tokenizing the SQL text, generating a syntax tree according to syntax rules, and analyzing the syntax tree to identify objects including tables and columns designated for encryption, and determines whether there is a target of encryption in tables and columns that are accessed as parsing results, when it is determined that an SQL sentence is a column to be inquired by a SELECT sentence in accordance with a type of SQL sentence, the application server decrypts user data and transmits a result value of the SQL text to the application, and when it is determined that the SQL sentence is input data or comparative data of a sentence other than a SELECT sentence in accordance with the type of SQL sentence, the application server modifies the SQL text with the user data encrypted and transmits the modified SQL text to the DBMS, and further comprising verifying whether a column which requires encryption in data received by the application from the DB server has actually been encrypted, wherein data transmitted and received between the application server and the DBMS is kept in an encrypted state, the data in the encrypted state is encrypted or decrypted by the application in the application server to reduce load on the DBMS, the application server renames "dbclient.dll," which is a DB client module used for executing SQL text, "client_org.dll," which is preset, and then renames a "dll" file created for hooking "client.dll" which is an original name, and when the application executes the SQL text, the application loads "client.dll," which is the hooking module, and then internally calls "client_org.dll," which is the original module, to perform an encryption process or a decryption process; and internally calling "client_org.dll" such that basic DB client functions are performed without change; wherein the application source code is unmodified and no DB view, trigger, or plug-in is required.

* * * * *